United States Patent [19]
Pyle et al.

[11] Patent Number: 5,958,230
[45] Date of Patent: Sep. 28, 1999

[54] FILTER FOR GASOLINE AND OTHER LIQUIDS

[75] Inventors: James Pyle, Bridgeport; Geoffrey Wilcox, Roxbury, both of Conn.

[73] Assignee: Eagle Fitter Corporation, Bridgeport, Conn.

[21] Appl. No.: 09/016,855

[22] Filed: Jan. 30, 1998

[51] Int. Cl.⁶ .......................... B01D 35/153; B01D 27/10
[52] U.S. Cl. .......................... 210/234; 210/235; 210/430; 210/443; 210/454; 210/DIG. 17
[58] Field of Search ................... 210/136, 234, 210/235, 443, 444, DIG. 17, 168, 441, 454, 248, 430, 171, 232

[56] References Cited

U.S. PATENT DOCUMENTS

| | | |
|---|---|---|
| 3,282,429 | 11/1966 | Wood et al. .............................. 210/136 |
| 5,182,015 | 1/1993 | Lee ........................................... 210/136 |
| 5,560,824 | 10/1996 | Sann et al. ............................... 210/253 |
| 5,695,633 | 12/1997 | Ernst et al. .............................. 210/441 |
| 5,698,093 | 12/1997 | Pyle et al. ................................ 210/136 |
| 5,770,065 | 6/1998 | Popoff et al. ............................ 210/232 |
| 5,846,417 | 12/1998 | Jiang et al. .............................. 210/235 |
| 5,855,780 | 1/1999 | Dye et al. ................................ 210/234 |

*Primary Examiner*—Jay H. Woo
*Assistant Examiner*—Frank M. Lawrence
*Attorney, Agent, or Firm*—Kaplan & Gilman, LLP

[57] ABSTRACT

A filter for fuel and the like comprising an inner filter element and an outer metal filter can which allows the element and can to work together so that when the filter can is removed from the dispensing apparatus, the filter element springs closed and locks against the filter can so that no fuel is spilled. Additionally, the filter can grasps the filter element and pulls it from the dispensing apparatus.

23 Claims, 7 Drawing Sheets

FILTER FOR GASOLINE AND OTHER LIQUIDS

TECHNICAL FIELD

This invention relates to filtering apparatus and more particularly, to an improved method and apparatus for filtering gasoline and the like which virtually eliminates all spillage during replacement of the filter.

BACKGROUND OF THE INVENTION

Fuel pumps and the like often contain filtering apparatus for removing minute particles from fuel or other liquid as it is pumped through an apparatus and dispensed. These filters are typically constructed using an outer metallic can and an inner filter element. Usually the outer metallic can and the inner filter element are a single unit and must be replaced entirely when dirty. When these filters are removed for replacement, the liquid contained within the filter, as well as that contained within the apparatus to which the filter is attached, is often spilled. Such spillage is environmentally unsafe as well as wasteful.

Recently it has become a goal to minimize the spillage of fuel and the accompanying environmental hazards of such spillage. U.S. Pat. No. 5,698,093 assigned to the assignee of the present invention represents one example of a device directed at this problem. The '093 patent teaches a technique of utilizing valves which shut off when the filter can is removed in order to trap fluid within the pumping apparatus. As further described in the '093 patent, the inner filter element is removed from the outer can, and the fluid within the outer can may then be disposed of properly and a new filter element installed. The outer can may then be re-attached and is thus reusable for the life of the apparatus.

While the '093 patent makes significant progress toward achieving a solution to the loss of liquid from the dispensing apparatus, there remains the problem of spillage from the outer can. First, when the outer can is removed from the dispensing apparatus, often the inner filter element remains stuck to the dispensing apparatus. This means that all of the fluid trapped in the filter element begins dripping onto the ground, thereby creating an environmental hazard. Additionally, if the entire filtering apparatus is mounted horizontally, then when it is removed from the dispensing apparatus, the fuel within the can will simply spill.

Other prior attempts to solve the foregoing problems have resulted in less than perfect solutions. For example, U.S. Pat. No. 5,098,559 to Mack represents still another attempt at a solution to the foregoing problems. Once again however, drawbacks similar to those described with respect to the '093 patent have prevented widespread commercial use of such an apparatus.

In view of the foregoing, there exists a need in the art for an improved filtering apparatus which includes: (1) a technique for allowing the inner filter to be replaced separately from the outer can; (2) insuring that such filter does not remain stuck to the pumping apparatus when the outer can is removed; and (3) further minimizing spillage and waste when the can is removed from the dispensing apparatus.

SUMMARY OF THE INVENTION

The above and other problems of the prior art are overcome in accordance with the present invention which relates to an improved filtering apparatus including an outer can and an inner filtering element which filters the fluid. The inner filtering element is preferably constructed as a cylinder with faceplates at the ends thereof and an opening running centrally there through. The faceplate is of such diameter as to substantially seal against the inner surface of the filter can when the filter can is removed from the pumping apparatus. Accordingly, fluid is trapped within the filter can and does not leak. Moreover, the central opening through the filter element is equipped with a valve which springs closed when the filter can is removed from the pumping apparatus. Accordingly, no fluid may escape through the central opening of the filter element.

Finally, the filter element is also equipped with means for firmly attaching itself to the bottom of the filter can. Accordingly, when the filter can is removed from the pumping apparatus, it pulls the filter element with it so that the filter element does not remain stuck to the pumping apparatus.

DETAILED DESCRIPTION OF THE PREFERRED EMBODIMENT

Figure 1:
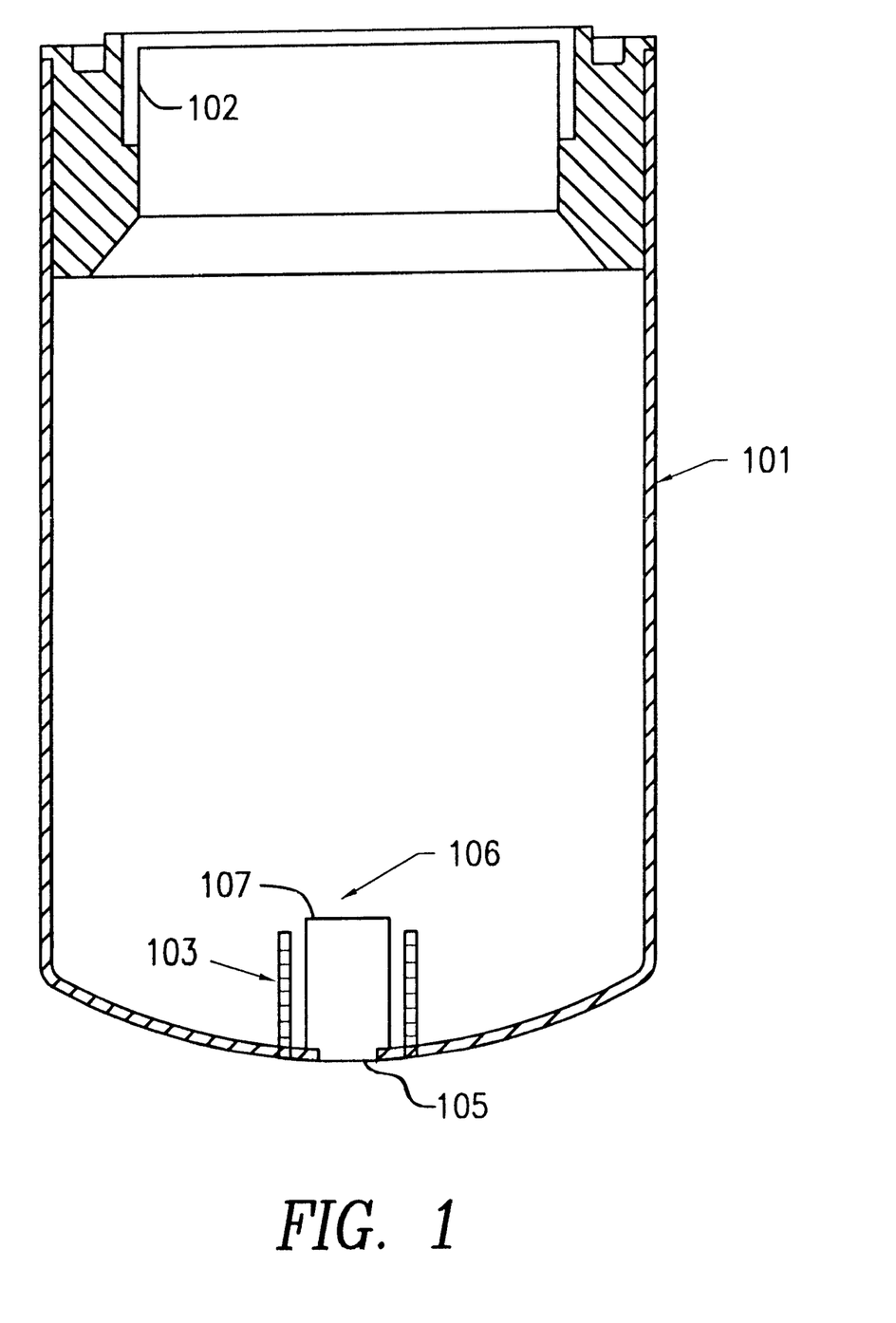
FIG. 1 is a side cross section view of the outer filter can of the invention.

FIG. 1 shows a side view of filter can 101 used with the present invention. The can 101 is intended to house the filter element as will be explained later herein. The can includes a threaded portion 102 for screwing onto a connecter of the type described in U.S. Pat. No. 5,698,093, the teachings of which are hereby incorporated by reference. Additionally, the outer can 101 includes a spring 103 mounted at the bottom thereof and a stub 105 mounted at the bottom of can 101 and including a tapered portion 106 to form a lip 107. The construction and purpose of the foregoing items will be described in more detail later herein.

Within filter can 101 there is disposed a filter element, not shown in FIG. 1, in order to filter fluid which enters through a plurality of openings and exits through a center pipe as more fully described in the previously incorporated U.S. Pat. No. 5,698,093. In accordance with known techniques, liquid to be filtered enters the can 101 and is forced through a filter material before exiting.

Figure 2:
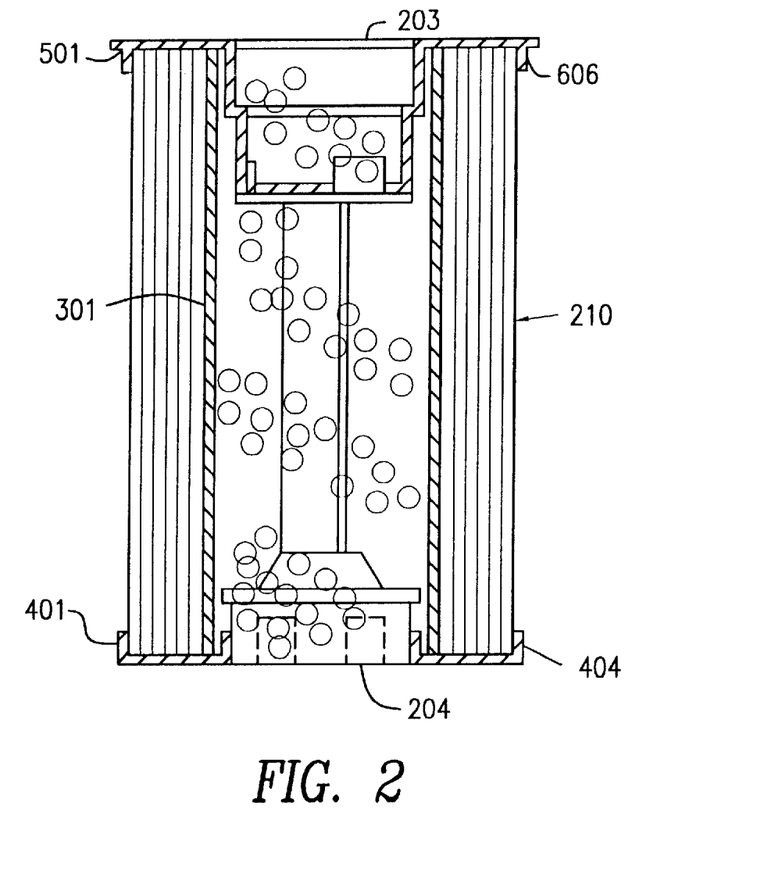
FIG. 2 is a side view of an inner filter element for use with the invention.
Figure 2A:
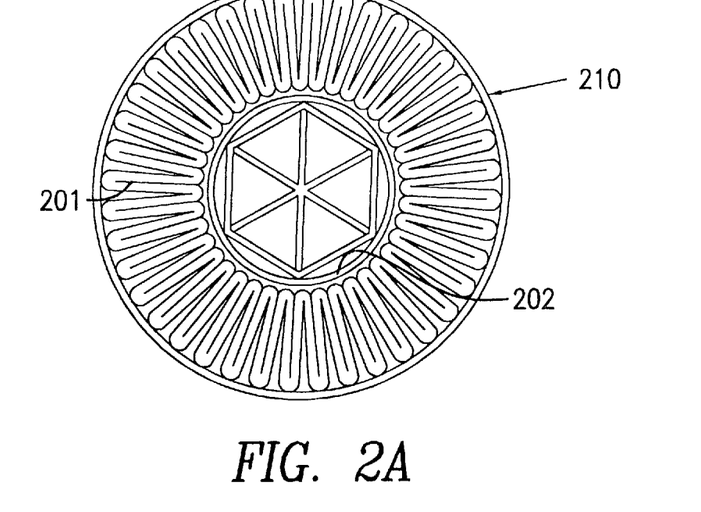
Figure 3:
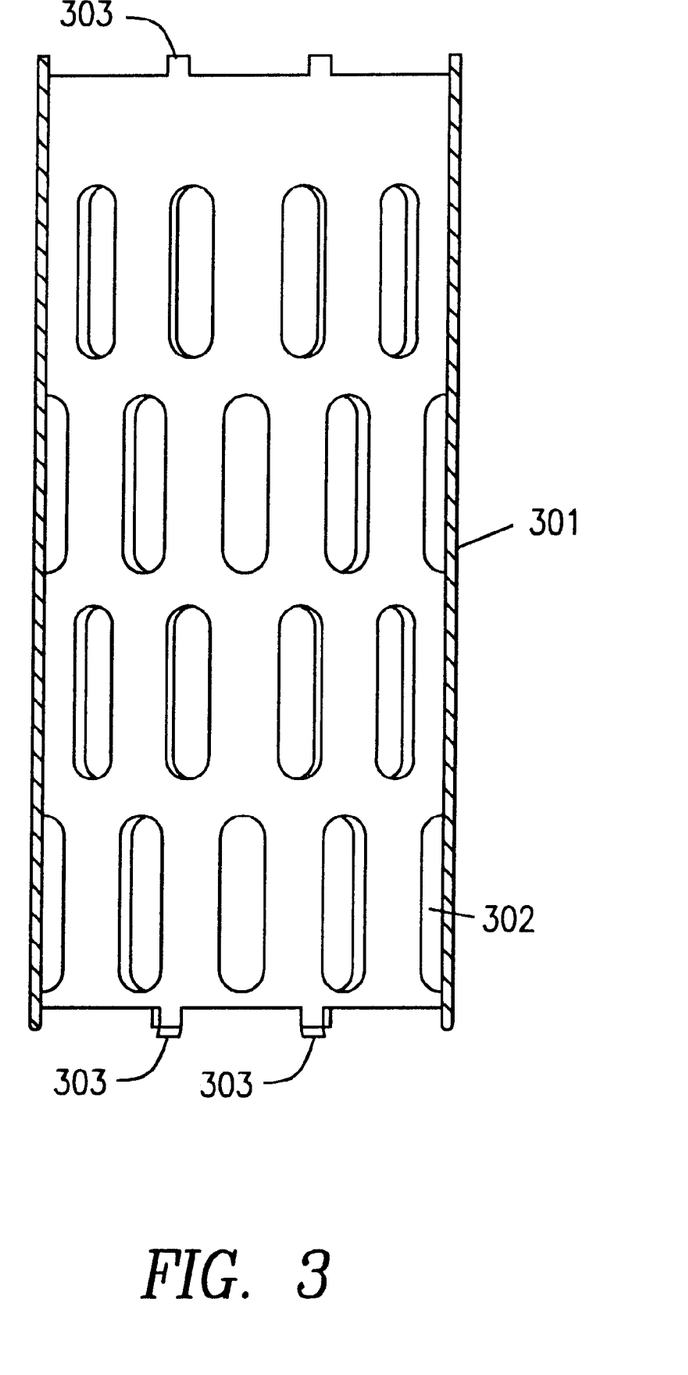
FIG. 3 is a cutaway view of a portion of the filter element.
Figure 4:
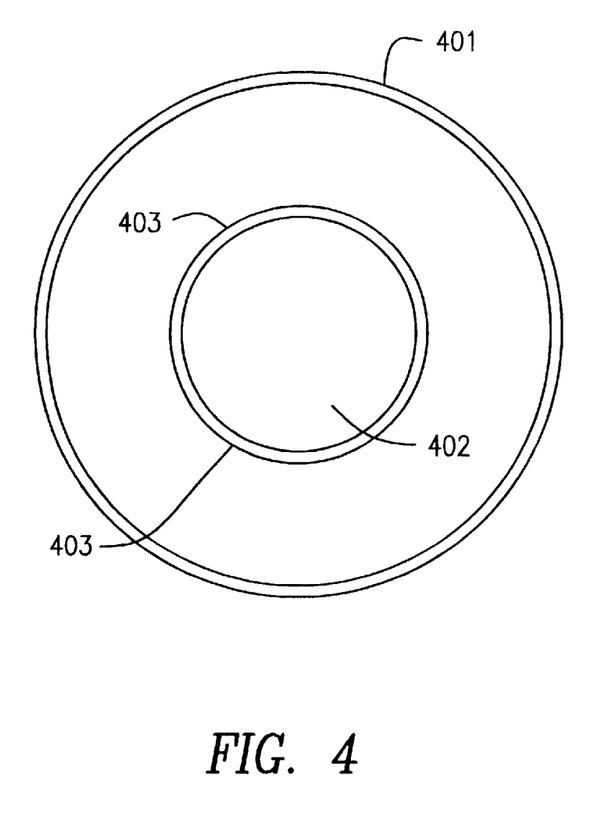
FIG. 4 depicts a faceplate used to construct the filter element.
Figure 4A:
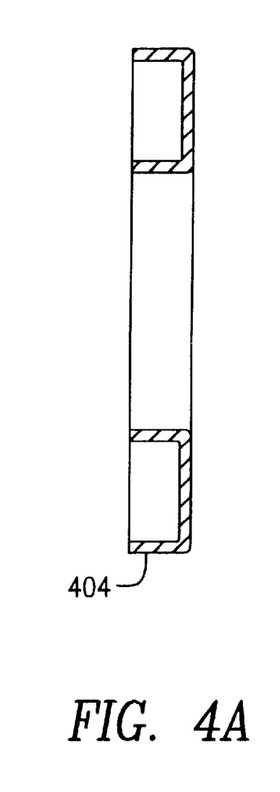

FIG. 2 shows a more detailed view of a filter element 210 for use in the present invention, said filter element including apparatus for implementing several of the improvements described herein. Specifically, filtering material 201 is folded in the standard back and forth fashion around a central opening 202 as is typical in the prior art. The filter material is wrapped around a cylindrical component 301 shown in FIG. 3, said cylindrical component including a plurality of openings 302. The cylindrical component 301 is mounted between faceplates 401 and 501 as shown. As shown in FIG. 3, cylindrical member 301 includes a plurality of tabs 303 for locking through slots in faceplates 401 and 501 during assembly. Other techniques of assembling the filter element, such as bonding the faceplates to the filter material and/or the cylindrical member 301, may also be used. Thus, the resulting filter element includes filter material 201 wrapped around cylindrical member 301 and sandwiched between faceplates 401 and 501.

Figure 5:
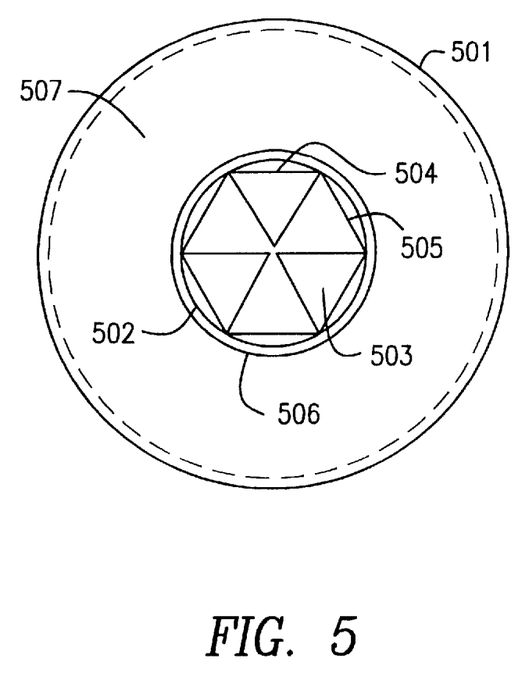
FIG. 5 depicts a second faceplate used to construct the filter element.

Turning to FIG. 5, shown therein is the faceplate 501 which mounts to cylindrical member 301 on the opposite end from faceplate 401. Faceplate 501 differs slightly from faceplate 401 in that faceplate 501 includes valve openings 502–504 through the center 505 thereof Specifically, the three triangular openings 502–504 operate in conjunction with a valving component and serve to assist in cutting off the flow of liquid when the filter can is removed from the dispensing apparatus or other machine to which it is connected as will be described later herein.

Figure 6:
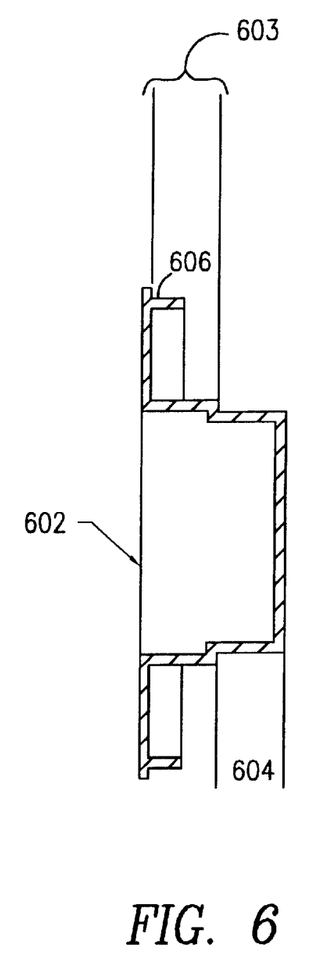
FIG. 6 is a side view of the faceplate of FIG. 5.

Turning to FIG. 6, shown therein is a side view of faceplate 501 which depicts the central elongated portion 602. It is understood that the length of central portion 602 designated as 603 is circular in cross-sectional shape, while the length of central portion 602 designated as 604 is hexagonal in shape. The six triangular sections formed by the hexagon alternate between being openings and being solid, for reasons more fully described below. Additionally, along every other outer wall of the hexagon, preferably those walls which form one side of the triangles which are open, are shallow ribs 507 which assist in gripping a shaft from the pumping apparatus to which the filter will be attached as shown in the previously incorporated patent. The faceplate 501 also includes a plurality of slots 506 for attaching to cylindrical member 301.

Figure 7:
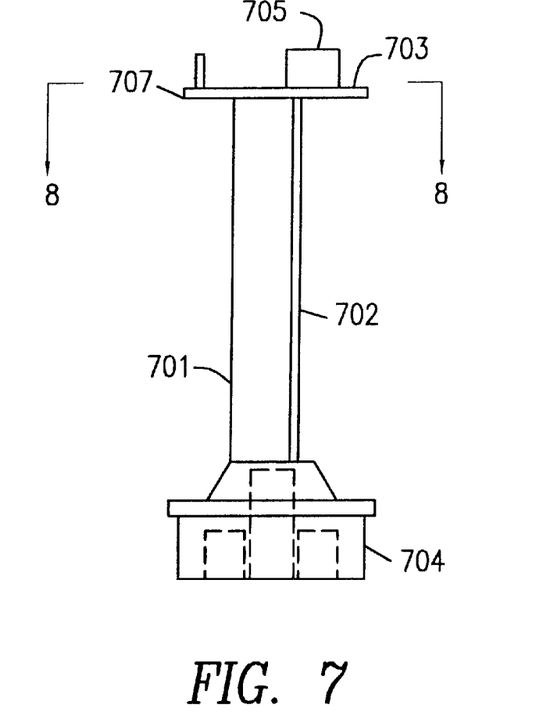
FIG. 7 shows a valving component for use with the invention.

Returning to FIG. 2, shown therein is the inner filter element almost assembled, where it can be seen that faceplates 401 and 501 are utilized to connect to opposite ends of the cylindrical member 301 with the filter material disposed there between. Lips 404 and 606 serve to contain the filter material within the circular shape, as is known in the prior art. It is noted that the opening that runs through cylindrical member 301 from one end to the other end of the filter is not left entirely open but rather, a valving component 701 of FIG. 7 is inserted therein.

The valving component contains a shaft 702 connecting a surface 703 to a bottom member 704. The bottom member 704 and surface 703 are each constructed to implement specific functions as more fulling described hereafter.

Figure 8:
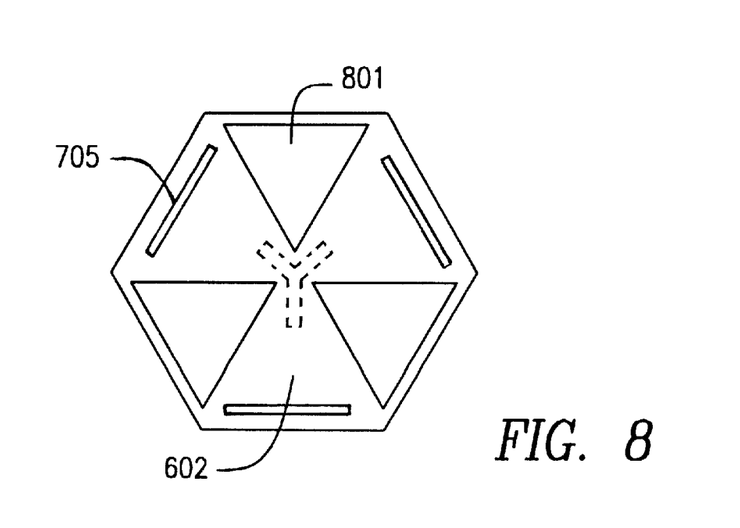
FIG. 8 shows a portion of the valving component of FIG. 7.

Surface 703 contains three valve plates 705 on solid triangular portions, each separated by open triangular portions, as can be appreciated from FIG. 8, which shows a top view of surface 703. The solid portions 802 each support a valve plate 705 and are separated by triangular openings 801.

Figure 9:
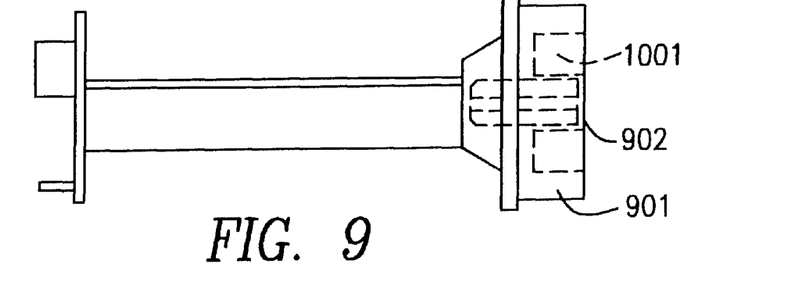
FIG. 9 depicts a side view of the valving component.
Figure 10:
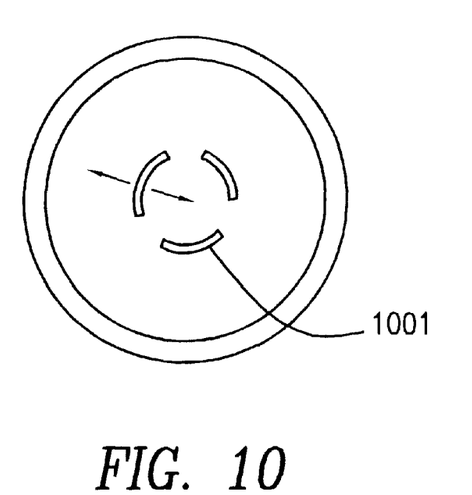
FIG. 10 shows a bottom view of the valving component.
Figure 11:
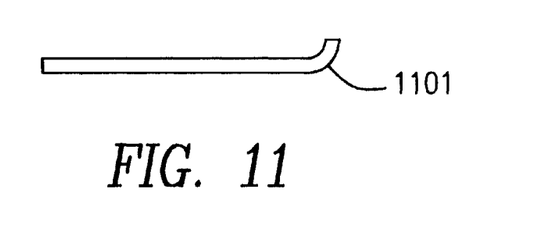
FIG. 11 shows a closeup of a "finger" connected to the valving component.

FIG. 9 shows a cross-sectional view of the valving component, including bottom member 704. The bottom member 704 includes a perimeter portion 901 and a central portion 902. The perimeter portion 901 is cylindrical as shown in FIG. 10, and the central portion 902 comprises a plurality of fingers 1001 which can resiliently be bent in and out under pressure as indicated by the arrows in FIG. 10. Each of the fingers 1001 includes a small lip 1101 as best shown in the exploded view of one of three fingers 1001 in FIG. 11. Lip 1101 will assist in gripping tapered portion 107 of FIG. 1 when the filter is installed in can 101.

In assembling the filter, the filter material is first wrapped around cylindrical member 301 and placed within faceplate 401. Prior to putting faceplate 501 on top of cylindrical member 301 and attaching the same, valving component 701 is inserted into cylindrical member 301 with bottom member 704 being placed into the end of cylindrical member 301 which is attached to faceplate 401. The other faceplate 501 is then attached to cylindrical member 301 as shown in FIG. 2. The plates 705 are inserted into openings 502–504 in faceplate 501. Using such an arrangement, it will be appreciated that the valve plates 705 may slide longitudinally up and down within the openings 502–504 of faceplate 501. Additionally, the openings 502–504 of faceplate 501 align with the solid portions 802 of surface 703, while the openings in surface 703 align with the solid portions of faceplate 501. Accordingly, when surface 703 is pressed against faceplate 501, the flow of liquid through channel 203 is cut off.

It can then be appreciated from a review of FIGS. 2, 5 and 8 that the valve plates 705 will be pushed downwardly in FIG. 2 by a central shaft from the dispenser apparatus as described in U.S. Pat. No. 5,698,093 when the filter is connected to the dispenser. This downward force on the valve plates 705 will then force the valve component to separate from the faceplate 501 and thus allow fuel to flow through the openings 502–504 and 801.

In operation, the entirely assembled inner filter element 210 is dropped within filter can 101 with faceplate 401 facing down in FIG. 1 so that faceplate 401 contacts the stub 105. The can is then screwed onto a shaft which fits into the hexagonal shape at the end of the inner filter element. Fingers 1001 then grip around tapered portion 106 of FIG. 1 to cause the valving component 701, and of course the attached entire inner filter element, to grip around lip 107 created by tapered portion 106 so that the lip 107 and the fingers 1001 are inseparable.

Additionally, spring 103 contacts faceplate 401 at the portion between 901 and 902, thereby tending to push the valving component 701. However, the shaft from the pumping apparatus matches the hexagonal shape created by faceplate 501 and fits snugly into faceplate 501. As the can is screwed on, the dispensing apparatus shaft forces valve plates 705 downwardly, pushing valving component 701 against the force created by spring 103. Accordingly, the surface 703 of valving component 701 separates from faceplate 501 and allows fuel to flow from the openings in faceplate 501 as well as the openings 801 shown in FIG. 8 of surface 703.

When the outer can is unscrewed however, tapered portion 106 pulls the entire filter element from the shaft of the dispensing apparatus to which it is attached. Accordingly, the shaft from the dispenser no longer pushes down on valve plates 705, but rather, spring 103 forces valving component 701 upwardly and locks closed the entire central opening of the inner filter element. Additionally, since faceplate 501 is of substantially the same circumference as the inner circumference of filter can 101, substantially no spillage can occur from the space between the filter element and the can 101, nor can any spillage occur from the central portion of the filter element since the arrangement described allows valving member 701 to lock closed the central opening.

The foregoing describes the preferred embodiment of the invention. Other modifications which fall within the scope of the appended claims are covered hereby.

We claim:

1. A filter for filtering fluid circulating through a machine, said filter comprising:
   a filter can for removably attaching to the machine;
   a filter element disposed within said filter can, said filter element including a channel for allowing fluid to be filtered to pass through the filter, said channel including an opening at an end thereof closest to said machine, said opening having non open solid portions disposed therein, said filter element further including two faceplates at opposite ends thereof.
   a shaft having two ends and extending through said channel, said shaft including a plate on the end thereof closest to said machine, said shaft being confined to within the filter element by the two faceplates and
   means for forcing the plate against the non open solid portions to block the flow of said fluid through said opening automatically when said filter is removed from said machine.

2. The filter of claim 1 wherein said filter can includes spring means disposed at an end of said filter can opposite an open end thereof arranged to force said plate against said solid portions.

3. The filter of claim 2 wherein said opening comprises alternating solid and void regions, and wherein said plate is forced against said solid regions to thereby block said open regions.

4. The filter of claim 3 wherein said plate includes a plurality of upstanding members, each of said upstanding members extending through a separate on of said void regions when said plate is forced against said solid regions.

5. The filter element of claim 4 wherein said upstanding members are substantially parallel in direction to said shaft.

6. The filter of claim 5 wherein said shaft, said plate, and said upstanding members are made from the same material.

7. The filter of claim 6 wherein said shaft includes a gripping means at an end opposite that where said plate is, and wherein said can includes a stub which is gripped by said gripping means such that when said can is removed from said machine, said filter element remains attached to said stub.

8. The filter of claim 7 wherein said stub includes a tapered portion and wherein said gripping means comprises a plurality of fingers for gripping said stub about said tapered portion thereof to thereby cause said filter element to attach to said stub.

9. The filter of claim 7 wherein said stub is surrounded by said spring means.

10. Filter apparatus for connecting to a machine to filter liquid under pressure, said apparatus comprising:
    a filter can having an open end,
    a filter element, said inner filter element comprising filtration material disposed within two faceplates, at least one of said faceplates having an opening for the flow of fuel, said filter element being disposed within said filter can, a first one of said faceplates being disposed substantially at the open end of the can, said first one of said faceplates substantially conforming in shape and size to said open end such that said faceplate prevents flow of liquid between said faceplate and said filter can when said liquid is not pressurized during operation of the machine, and valve means, for closing said opening in said faceplates in response to removal of said can from said machine to thereby prevent spillage of said liquid through opening, said valve means comprising a shaft disposed longitudinally within said filter element for substantially the entire length thereof, said shaft being slidable in the longitudinal direction and being biased to slide in a direction that prevents flow of fluid when said filter can is removed from a machine to which it is connected and to allow said flow of fluid when said filter can is connected for operation with said machine said shaft being limited in its slidable movement by the two faceplates.

11. A filter comprising:
    a filter can having spring means; and
    a filter element having a channel extending longitudinally through said filter element, said channel having a shaft longitudinally extending substantially entirely therethrough, said shaft being slidable longitudinally and being biased by said spring in a direction away from said spring, said shaft being formed integrally with said filter element such that when said filter element is removed for replacement, said shaft is also removed.

12. The filter of claim 11 further comprising an attaching means and wherein said attaching means is a tapered stub disposed within said can.

13. The filter of claim 11 wherein said shaft includes a surface which may be forced against openings at an end of said channel in response to said spring means in order prevent the flow of liquid.

14. The filter of claim 13 wherein said filter element includes two faceplates, one of said faceplates including a plurality of ribs for gripping a portion of a machine to which said filter is to be attached.

15. The filter of claim 13 wherein said surface includes a plurality of plates for contacting the machine when said filter is connected thereto in order to force said surface away from said openings.

16. A filter element comprising two faceplates, each of said faceplates being disposed at an opposite end of a longitudinal channel, each of said faceplates including an opening therethrough,
    valving means slidably disposed within said longitudinal channel such that the opening in one of said faceplates is closed when said valving means is slid to contact said first faceplate and open when said valving means is slid to contact said second faceplate.

17. The filter element of claim 16 wherein said valving means has two ends and comprises gripping means at a first end thereof for gripping a stub and a surface at the second end thereof, said surface including a plurality of openings and a plurality of plates disposed between said openings.

18. A filter comprising a filter can and a filter element disposed therein, the filter can comprising an open threaded end and a closed end, the filter can including a spring and a stub connected to said closed end, the filter element including a slidable shaft that connects to said stub and causes the entire filter element to remain within said filter an when said filter can is removed from a machine to which it may be connected.

19. The filter of claim 18 wherein the filter element includes a central channel with a slidable valving means disposed therein.

20. The filter of claim 19 wherein said valving means includes a hexagonal shaped surface.

21. The filter of claim 20 wherein said valving means includes means for gripping said stub.

22. A filter comprising a filter element disposed within a filter can, the filter element having a longitudinal channel extending therethrough, the longitudinal channel having a first opening at an end thereof, the opening having solid portions thereof and;

biased plate means disposed within said channel and biased toward said first opening such that said plate means contacts said solid portions as a result of said bias to prevent fluid flow but is forced away from said portions to thereby allow fluid flow through said first opening when said filter is attached to a machine with which said filter is used the shaft having fingers at the bottom thereof for gripping a stub such that when said fingers grip said stub, said filter element remains within the outer can.

23. A filter for liquids and for attachment to a machine comprising:

an outer filter can being open at one end thereof and having a stub and a spring at the other end thereof;

a filter element comprising two faceplates, a central member, filtration material wrapped around said central member and disposed between said faceplates, and a valving shaft slidably disposed within said central member, said faceplates limiting the movement of said valving shaft and maintaining said valving shaft within said filter element, said valving shaft comprising a plurality of fingers for gripping said stub, said valving shaft being connected to the remainder of said filter element such that when said fingers grip said stub and maintain said valving shaft within said filter can as said filter can is removed from the machine to which it is connected, said filter element is entirely maintained within said filter can.

* * * * *